US010122804B1

(12) United States Patent
Garvin et al.

(10) Patent No.: US 10,122,804 B1
(45) Date of Patent: Nov. 6, 2018

(54) CALCULATING AND RECORDING USER INTERACTION TIMES WITH SELECTED WEB SITES OR APPLICATION PROGRAMS

(71) Applicant: STACKUP LLC, Englewood, CO (US)

(72) Inventors: Nicholas Edward Garvin, Larkspur, CO (US); Stephen L. Maynard, Thornton, CO (US)

(73) Assignee: STACKUP LLC, Englewood, CO (US)

( * ) Notice: Subject to any disclaimer, the term of this patent is extended or adjusted under 35 U.S.C. 154(b) by 476 days.

(21) Appl. No.: 14/535,189

(22) Filed: Nov. 6, 2014

Related U.S. Application Data

(60) Provisional application No. 61/900,984, filed on Nov. 6, 2013, provisional application No. 61/900,987, filed on Nov. 6, 2013.

(51) Int. Cl.
*G06F 3/0482* (2013.01)
*G06F 17/30* (2006.01)
*H04L 29/08* (2006.01)

(52) U.S. Cl.
CPC ............ *H04L 67/22* (2013.01); *G06F 3/0482* (2013.01); *G06F 17/30887* (2013.01)

(58) Field of Classification Search
CPC ............ G06F 3/0484; G06F 17/30861; G06F 11/3438; G06F 2201/875
See application file for complete search history.

(56) References Cited

U.S. PATENT DOCUMENTS

| 5,796,952 | A * | 8/1998 | Davis | G06F 11/3438 707/E17.12 |
| 2002/0099812 | A1 * | 7/2002 | Davis | G06F 11/3495 709/224 |
| 2002/0128925 | A1 * | 9/2002 | Angeles | G06F 11/3414 705/26.1 |
| 2003/0083960 | A1 * | 5/2003 | Dweck | G06F 17/30876 705/341 |
| 2004/0073660 | A1 * | 4/2004 | Toomey | H04L 63/08 709/224 |
| 2004/0133671 | A1 * | 7/2004 | Taniguchi | G06Q 10/063 709/224 |
| 2005/0183143 | A1 * | 8/2005 | Anderholm | G06F 11/32 726/22 |
| 2006/0159432 | A1 * | 7/2006 | Mazzaferri | H04L 29/06 386/253 |
| 2007/0209017 | A1 * | 9/2007 | Gupta | G06F 3/0485 715/781 |

(Continued)

*Primary Examiner* — Daeho D Song

(57) ABSTRACT

Embodiments of the present invention provide for systems and methods to track and calculate user interactivity time with one or more specified websites or application programs. A list of websites and/or application programs for tracking may be created and maintained, and when a user accesses and interacts with one of the websites or application programs, the user interactivity time with that particular application program or website is tracked. Periods of user inactivity with the particular application program or website are not counted towards the user interactivity time. The resulting user interactivity time data with each specified website and specified application program can be utilized in various manners, such as for generating reports, displays, or may be analyzed in numerous ways depending upon the particular implementation.

20 Claims, 16 Drawing Sheets

(56) References Cited

U.S. PATENT DOCUMENTS

| | | | | |
|---|---|---|---|---|
| 2008/0133287 A1* | 6/2008 | Slattery | G06F 11/3419 | 705/32 |
| 2008/0162206 A1* | 7/2008 | Mak | G06Q 30/02 | 705/14.53 |
| 2008/0228910 A1* | 9/2008 | Petri | G06F 17/30905 | 709/224 |
| 2009/0119062 A1* | 5/2009 | Owens | G06Q 10/10 | 702/176 |
| 2009/0210305 A1* | 8/2009 | Lyons | G06Q 30/02 | 705/14.54 |
| 2010/0121850 A1* | 5/2010 | Moitra | G06F 17/30861 | 707/737 |
| 2010/0131835 A1* | 5/2010 | Kumar | G06Q 30/0224 | 715/205 |
| 2010/0205541 A1* | 8/2010 | Rapaport | G06Q 10/10 | 715/753 |
| 2010/0295774 A1* | 11/2010 | Hennessey | G06F 3/013 | 345/156 |
| 2010/0324964 A1* | 12/2010 | Callanan | G06Q 10/06 | 705/322 |
| 2012/0054672 A1* | 3/2012 | McDowell | G09B 17/003 | 715/784 |
| 2012/0203592 A1* | 8/2012 | Ravindran | G06Q 30/0204 | 705/7.29 |
| 2012/0278251 A1* | 11/2012 | Pinsker | G06Q 10/103 | 705/342 |
| 2012/0324375 A1* | 12/2012 | Mathews | G06F 17/30861 | 715/760 |
| 2013/0004930 A1* | 1/2013 | Sorenson | G09B 7/02 | 434/350 |
| 2013/0071085 A1* | 3/2013 | Ryman | H04N 5/783 | 386/230 |
| 2013/0110565 A1* | 5/2013 | Means, Jr. | G06Q 10/06 | 705/7.11 |
| 2013/0136253 A1* | 5/2013 | Liberman Ben-Ami | H04M 3/5191 | 379/265.09 |
| 2013/0304906 A1* | 11/2013 | Yavilevich | H04L 67/22 | 709/224 |
| 2014/0040786 A1* | 2/2014 | Swanson | G06F 17/30899 | 715/760 |
| 2014/0058801 A1* | 2/2014 | Deodhar | G06Q 10/0639 | 705/7.38 |
| 2014/0180828 A1* | 6/2014 | Iwasaki | G06Q 30/02 | 705/14.68 |
| 2014/0325407 A1* | 10/2014 | Morris | G06F 3/04842 | 715/765 |
| 2015/0003595 A1* | 1/2015 | Yaghi | G06Q 10/063 | 379/85 |
| 2015/0058114 A1* | 2/2015 | Yi | G06Q 30/0242 | 705/14.41 |

* cited by examiner

CALCULATING AND RECORDING USER INTERACTION TIMES WITH SELECTED WEB SITES OR APPLICATION PROGRAMS

CROSS-REFERENCE TO RELATED APPLICATIONS

This application claims the benefit under 35 U.S.C. 119(e) of U.S. Provisional Patent Application No. 61/900,984 filed Nov. 6, 2013 entitled "Calculating and Recording User Interaction Times with Selected Web Sites or Application Programs" and to U.S. Provisional Patent Application No. 61/900,987 filed Nov. 6, 2013 entitled "Method and System for Determining Proficiency on a Subject," the disclosures of which are hereby incorporated by reference in their entirety.

TECHNICAL FIELD

Embodiments of this invention relate, generally, to tracking a user's interactivity with web sites or application programs.

BACKGROUND

Conventionally, computer systems that track user's internet usage, such as in the context of an employer tracking an employee's use of the Internet, are understood to track which web sites are accessed by the employee. As recognized by the present inventors, this tracking is typically without regard to whether the user is actively engaged in a particular web site, or whether the user merely has a web site open in a browser window, which thereby may result in incorrect calculations of time.

As recognized by the present inventors, what is needed is a computer system that can track, calculate and record the amount of time that a user is actively engaged in the use of one or more selected web sites, or if desired application programs, wherein the time while a user in not interacting with the web sites or application program is not included in the calculated time.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

One or more embodiments of the present disclosure provide systems and methods and computer program products for calculating and recording a user's interaction time with one or more selected web sites and/or application programs.

According to one broad aspect of one embodiment of the present disclosure, disclosed herein is a method for tracking interactivity time by a user with a web site. In one example, the method may include providing for selecting by the user one or more websites to track the user's interactivity with said websites; detecting access by the user with the selected one or more websites; tracking an amount of interactivity times that the user is interacting with each of the selected one or more web sites; detecting inactivity by the user with each of the selected one or more websites, wherein the inactivity suspends accumulation of the amount of interactivity times; and storing the interactivity times.

In one example, the method may also include providing a control in a graphical user interface for the user to selectively enable recording of interactivity time with each of the selected one or more websites. The method may also include, for the operation of detecting access, detecting an initiation of a browser program that loads a URL corresponding to the selected one or more websites. In another example, the tracking operation may include accumulating a plurality of periods of times that the user is interacting with the selected one or more websites. In one example, the operation of detecting inactivity may also include loading a reloadable timer with a countdown amount. In another example, the method may also include approximating an amount of time required for the user to absorb content of a website based upon an amount of the content and/or a size of an application window displaying said content, and forming the countdown amount based on said approximating operation. In another example, the method may include providing a list of categories, wherein each of said one or more websites corresponds to at least one of said categories. In another example, the method may include displaying the interactivity time of the user with each of said selected websites.

According to another broad aspect of another embodiment of the present disclosure, disclosed herein is a system for a tracking of interactivity time by a user with a web site. In one example, the system may include at least one processor; a memory coupled to the at least one processor, the memory for storing instructions; and an interactivity tracking engine operating with the processor, including a module for providing for selecting by the user one or more websites to track the user's interactivity with said websites; a module for detecting access by the user with the selected one or more websites; a module for tracking an amount of interactivity times that the user is interacting with each of the selected one or more web sites; a module for detecting inactivity by the user with each of the selected one or more websites, wherein the inactivity suspends accumulation of the amount of interactivity times; and a module for storing the interactivity times. Other modules may be provided which implement one or more operations, features or functions disclosed herein.

According to another broad aspect of another embodiment of the present disclosure, disclosed herein is a method for tracking interactivity time by a user with an application program. In one example, the method may include providing for selecting one or more application programs to track the user's interactivity with said application programs; detecting access by the user with the one or more application programs; tracking an amount of interactivity time that the user is interacting with the one or more application programs; detecting inactivity by the user with the one or more application programs, wherein the inactivity suspends accumulation of the amount of interactivity time; and storing the interactivity time. In one example, the method may also include displaying the interactivity time of the user with each of said selected application programs. The method may also include one or more of the operations or functions described herein.

Other embodiments of the disclosure are described herein. The features, utilities and advantages of various embodi-

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

Disclosed herein are various embodiments of processes, systems, and computer program products for calculating and recording a user's interaction time with one or more selected web sites and/or application programs.

Embodiments of the present invention provide for systems and methods to track and calculate user interactivity time with one or more specified websites or application programs. As described herein, a list of websites and/or application programs for tracking may be created and maintained, and when a user accesses and interacts with one of the websites or application programs, the user interactivity time with that particular application program or website is tracked. Periods of user inactivity with the particular application program or website are not counted towards the user interactivity time. The resulting user interactivity time data with each specified website and specified application program can be utilized in various manners, such as for generating reports, displays, or may be analyzed in numerous ways depending upon the particular implementation.

When interactivity with content/web pages is being recorded, loss of user activity or interactivity is also detected. Some embodiments of the present invention approximate the time required to absorb the current content based on the content itself, the size of the application window displaying the content, and events received from human interface devices on the system displaying the content. Time spent interacting with content displayed in a supported application or web site is recorded. Furthermore, access to the recording mode is generally available without regard to the application that is currently active.

In one example, supported applications can include browsers, readers, viewers, and other applications, for instance applications that can be queried to determine the content being displayed. Furthermore, the total amount of time spent in the application or content (including, for example, text, graphics, sound, and video files) is recorded or tracked based on user interactivity with the application or content.

Figure 1:
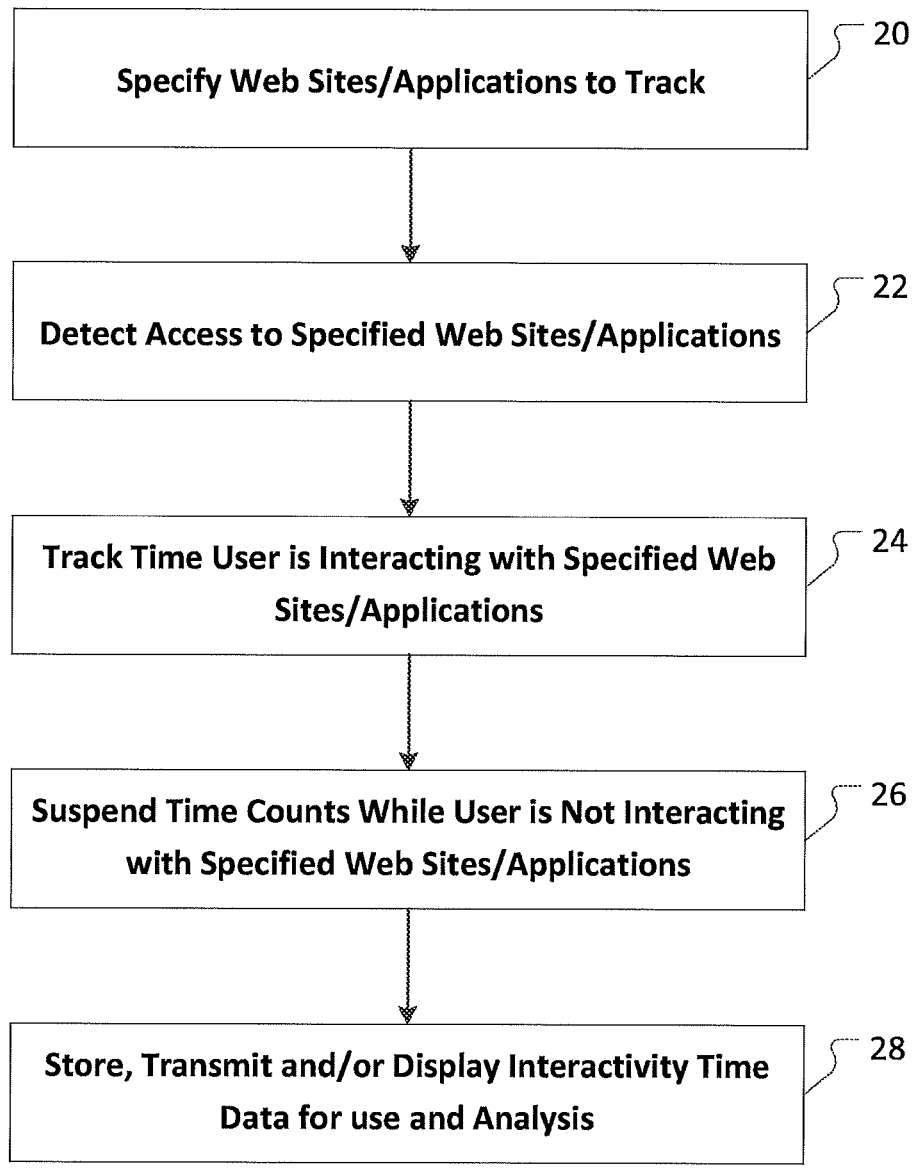
FIG. 1 illustrates an example of a process for calculating and recording a user's interaction time with one or more selected web sites, in accordance with one embodiment of the present invention.

FIG. 1 illustrates an example of a process for calculating and recording a user's interaction time with one or more selected web sites or application programs, in accordance with one embodiment of the present invention.

The operations of FIG. 1 can be implemented on a computer, server, the user's mobile device (e.g., mobile phone or tablet computer) or other computing device.

At operation 20, websites and application programs may be selected or specified for tracking user interactivity therewith. In one example, a plurality of websites can be selected, for instance by the user, and the website (and other information such as the website's base URL) placed in a list so that future access by the user and interactivity time by the user with each of the plurality of websites is tracked. Likewise, a plurality of application programs—such as word processing programs, spreadsheet programs, CAD drawing programs, photo/graphic arts programs, or any other type of conventional application program—can be selected, for instance by the user, and placed in the list so that future access by the user and interactivity time by the user with each of the plurality of application programs is tracked.

At operation 22, access is detected (for instance, by a user's computing device) to one or more of the websites and/or the application programs specified at operation 20. For instance, in one example, operation 22 detects the initiation/opening/launching of an application program specified at operation 20, on a user's computing device. In another example, operation 22 detects the access to a URL/website specified in operation 20, for instance by a user's browser program.

At operation 24, an amount of time that the user is interacting with a website or application program is tracked. In one example, operation 24 is responsive to the detecting operation 22. In one example, operation 24 tracks the user's interactivity time with a specific application program or a specific website by accumulating various periods of time that the user is interacting with the specified application program/website, and calculating a total amount of interactivity time.

At operation 26, tracking user interactivity time is suspended while the user is not interacting with the specified application program or website. For instance in one example, if the process is tracking user interactivity time with a website www.CNN.com, and the user has a browser window opened with content from CNN.com loaded, operation 24 tracks the amount of time that the user interacts with the website, and if there are periods of user inactivity with the website, operation 26 would suspend the interactivity time amount during the periods of user inactivity with the website. As an example, if the user has content from CNN.com loaded into a browser window, but then does not interact with the browser window for a period of 35 min. (for instance if the user leaves the user's computer device to attend a meeting), operation 26 would detect the inactivity and suspend the interactivity time during the period of inactivity. In this manner, operation 26 prevents inaccurate calculations of user interactivity time with a specified website or application program during periods of user inactivity with the specified website or application program.

At operation 28, the user interactivity time data may be stored, transmitted, displayed, or used or analyzed in any manner. For instance, the interactivity time data for a plurality of application programs and websites can be used in various manners, such as but not limited to stored in a database, transmitted for analysis, used to generate one or more reports, displayed to the user or to others interested in such interactivity time data.

If a user has multiple application programs and or websites operating simultaneously, operations 22-28 can be performed specifically and uniquely to each particular application program and each particular website, so that user interactivity time for each particular application program and each particular website is uniquely tracked.

In another example, operations 22-28 may be selectively enabled based on a recording control (i.e., a control or button within a graphical user interface) that can be activated or deactivated by the user. For instance, if a user desires to track user interactivity time with a CAD drawing program, the user may activate a "Record" button that can be associated with the CAD drawing program or provided in another program or window. When the record button is activated, operations 22-28 are enabled.

Figure 2:
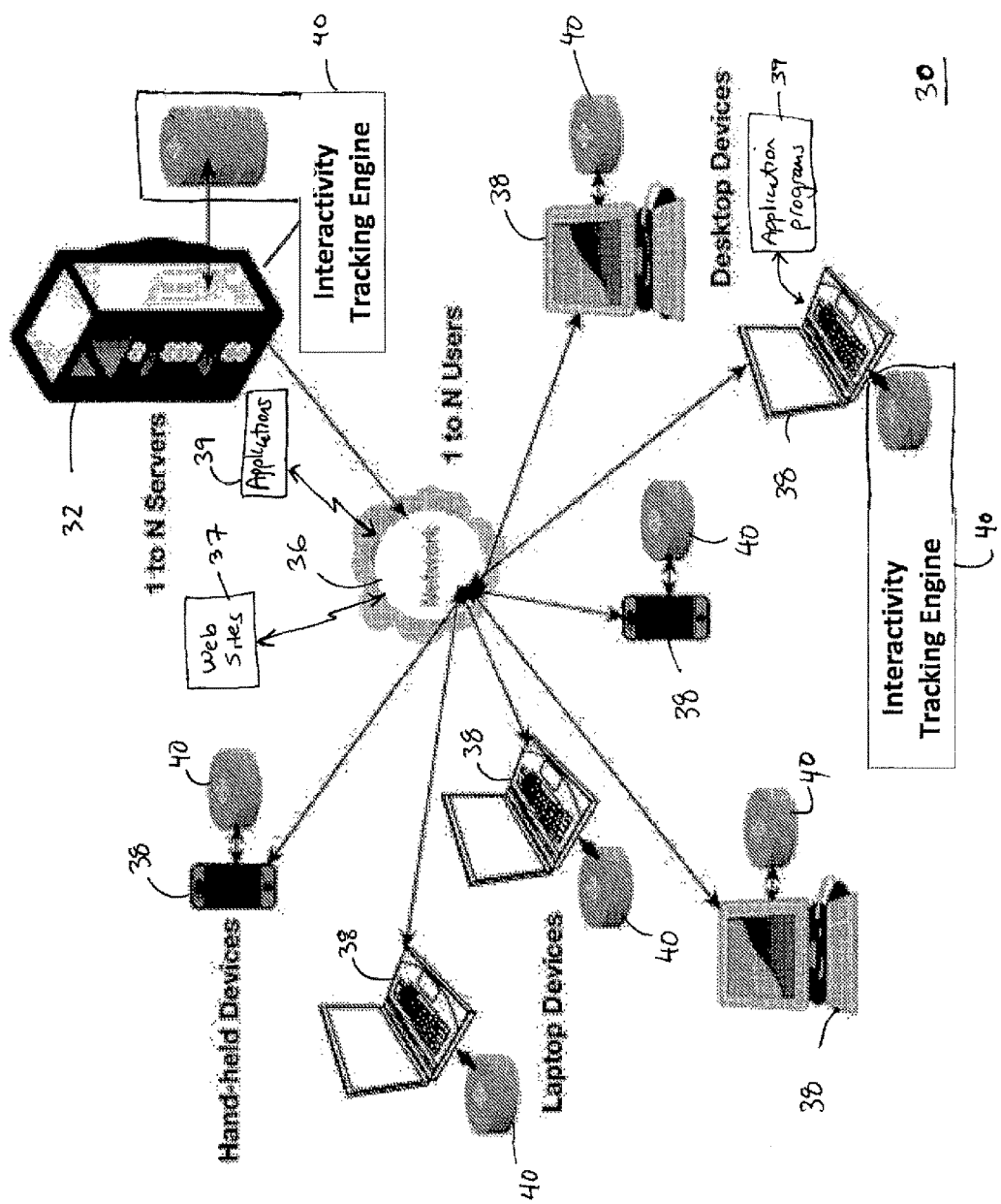
FIG. 2 illustrates an example of a system for calculating and recording a user's interaction time with one or more selected web sites, in accordance with one embodiment of the present invention.

FIG. 2 illustrates an example of a block diagram of a networked system 30 which may utilize one or more embodiments of the present invention. One or more servers 32 having one or more databases 34 may be coupled with a network 36 such as the Internet providing access to one or more web sites 37 or application program 39. One or more user computing devices 38, such as handheld computing devices, mobile devices, tablet computers, laptop computing devices, desktop computing devices may also be coupled with the network 36 to access, interact with and communicate with the one or more servers 32 and one or more databases 34.

In one example, an interactivity tracking engine 40 is provided in the system of FIG. 2. The interactivity tracking engine 40 may be configured to perform one or more of the operations, processes, features or functions described herein, in order to track the user interactivity time with one or more selected websites 37 or application programs. In one example, the interactivity tracking engine 40 may be provided on the one or more servers 32 and may operate on the servers 32 in order to provide functionality to the user over the network 36, for instance for tracking user interactivity cloud-based applications 39 and websites 37. In another example, an interactivity tracking engine 40 may be provided on a user's local computing device 38, such as in the form of an application program 39 running on a user's desktop computer, laptop computer, tablet computer, mobile phone, or other user computing device 38.

Web sites 37 in which user interactivity can be monitored by embodiments of the present invention can include (but are not limited to) those web sites or web pages operating over a network (such as the Internet) or in the cloud, or web sites or web pages running in a local network such as an intranet. Applications 39 in which user interactivity can be monitored by embodiments of the present invention can include (but are not limited to) those applications running locally on a user's computing device, or applications operating over a network such as cloud-based applications.

In order to facilitate detecting user activity on a given device 38 with a given application 39 accessing multiple data types stored locally or in the network (or cloud) of FIG. 2, embodiments of the present invention may be deployed on a plurality of devices 38 and can interact with a plurality of applications 39 or web sites 37 to properly determine the duration of said activity.

Figure 3:
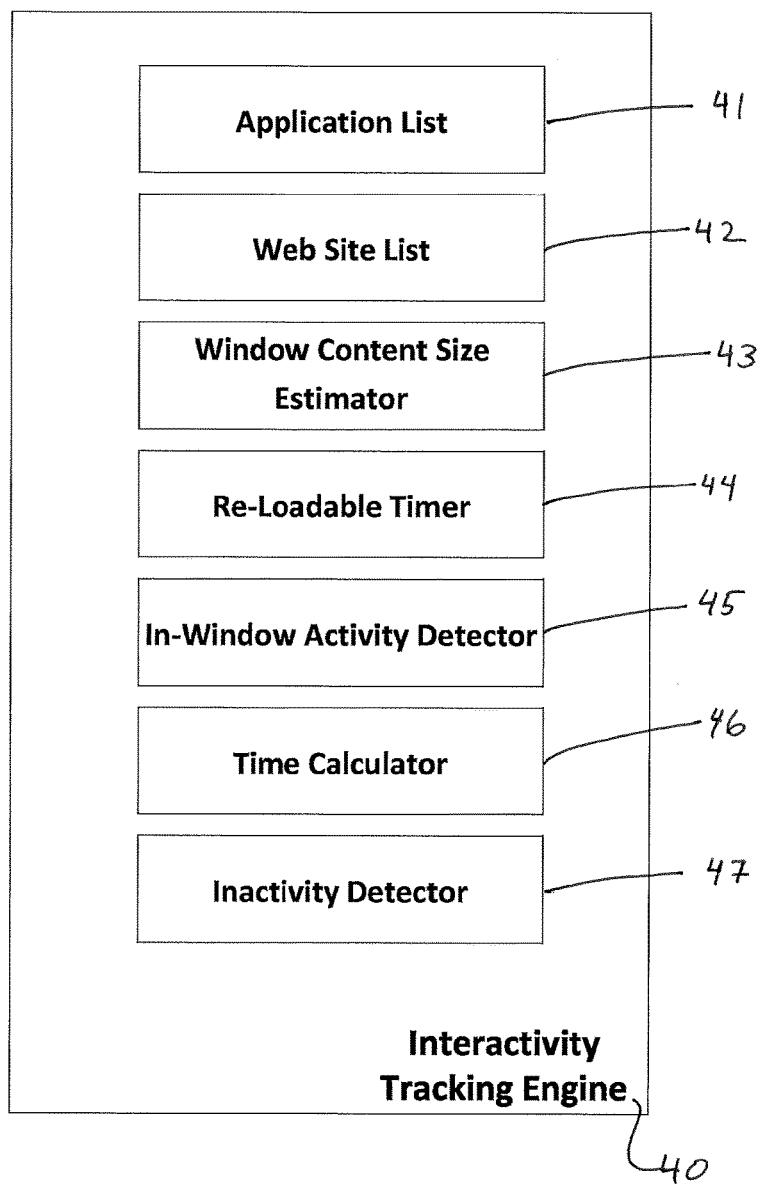
FIG. 3 illustrates an example of an interactivity tracking engine having a plurality of modules, in accordance with one embodiment of the present invention.

FIG. 3 illustrates an example of a block diagram of an interactivity tracking engine 40 having a plurality of modules or components providing one or more functions, operations, or processes as described herein. In one example, an interactivity tracking engine 40 may be provided with an application list component/module 41 which receives and stores one or more specific application programs 39 selected for user interactivity tracking. The specific application programs 39 may be selected by the user, or may be selected by other persons (such as a system administrator) or other mechanisms for instance, application programs 39 may be selected for tracking by a computer program or recommendation engine.

In one example, an interactivity tracking engine 40 may be provided with a web site list component/module 42 which receives and stores one or more specific websites 37 (and their corresponding URLs) selected for user interactivity tracking. The specific websites 37 may be selected by the user, or may be selected by other persons (such as a system administrator) or other mechanisms for instance, websites 37 for tracking may be selected for tracking by a computer program or recommendation engine.

In one example, an interactivity tracking engine 40 may be provided with a window content size estimator component/module 43 which estimates or calculates the amount of content within an application window or browser window. As described herein, the window content size estimator module 43 can calculate an amount of time to load in a reloadable timer based on the amount of content contained within a window. The resulting information can be utilized to help track user interactivity time, as well as to detect periods of user inactivity time, with the content within a particular application window or browser window.

In one example, an interactivity tracking engine 40 may be provided with a reloadable timer component/module 44. As described herein, a reloadable timer module 44 can be utilized to help track user interactivity time with an application program 39 or website 37, and may also be utilized to detect periods of user inactivity time.

In one example, an interactivity tracking engine 40 may be provided with an in-window activity detector component/module 45, which detects user activity within a particular window (such as an application window or browser window). The in-window activity detector 45 is particularly useful when a user has multiple windows opened within the user's computing device for instance, where the user is quickly switching between multiple application program windows and various browser windows with differing websites. The in-window activity detector 45 can notify the interactivity tracking engine 40 as to which window (i.e., application program window or website browser window) the user is currently interacting with.

In one example, an interactivity tracking engine 40 may be provided with a time calculator 46 for calculating user interactivity time (or periods thereof) where the user is interacting with a specified application program 39 or website 37. In one example, the time calculator 46 receives information from one or more of the other components/modules of the interactivity tracking engine 40, and based on the information, calculates the amount of time that the user is interacting with a particular application program 39 or website 37. In one example, the time calculator 46 can also store and transmit the interactivity time data to other processes or devices in the computing system for use and analysis therein.

In one example, an interactivity tracking engine 40 may be provided with an inactivity detector 47, for detecting periods of user inactivity with a particular application program 39 or website 37. The inactivity detector 47 can detect, for instance, when an application program or website browser window is opened within a user's computing device 38 but where the user is not interacting with the particular application program 39 or website 37 browser window. The inactivity detector 47 can provide data to one or more of the components/modules of FIG. 3.

FIGS. 4-8 illustrate examples of graphical user interfaces which may be utilized with one or more embodiments of the present disclosure. It is understood that these examples of graphical user interfaces are provided to illustrate various features and functions of embodiments of the present disclosure, and that implementations of the present disclosure could be formed and practiced using different graphical user interfaces including one or more features and functions disclosed herein.

Figure 4:
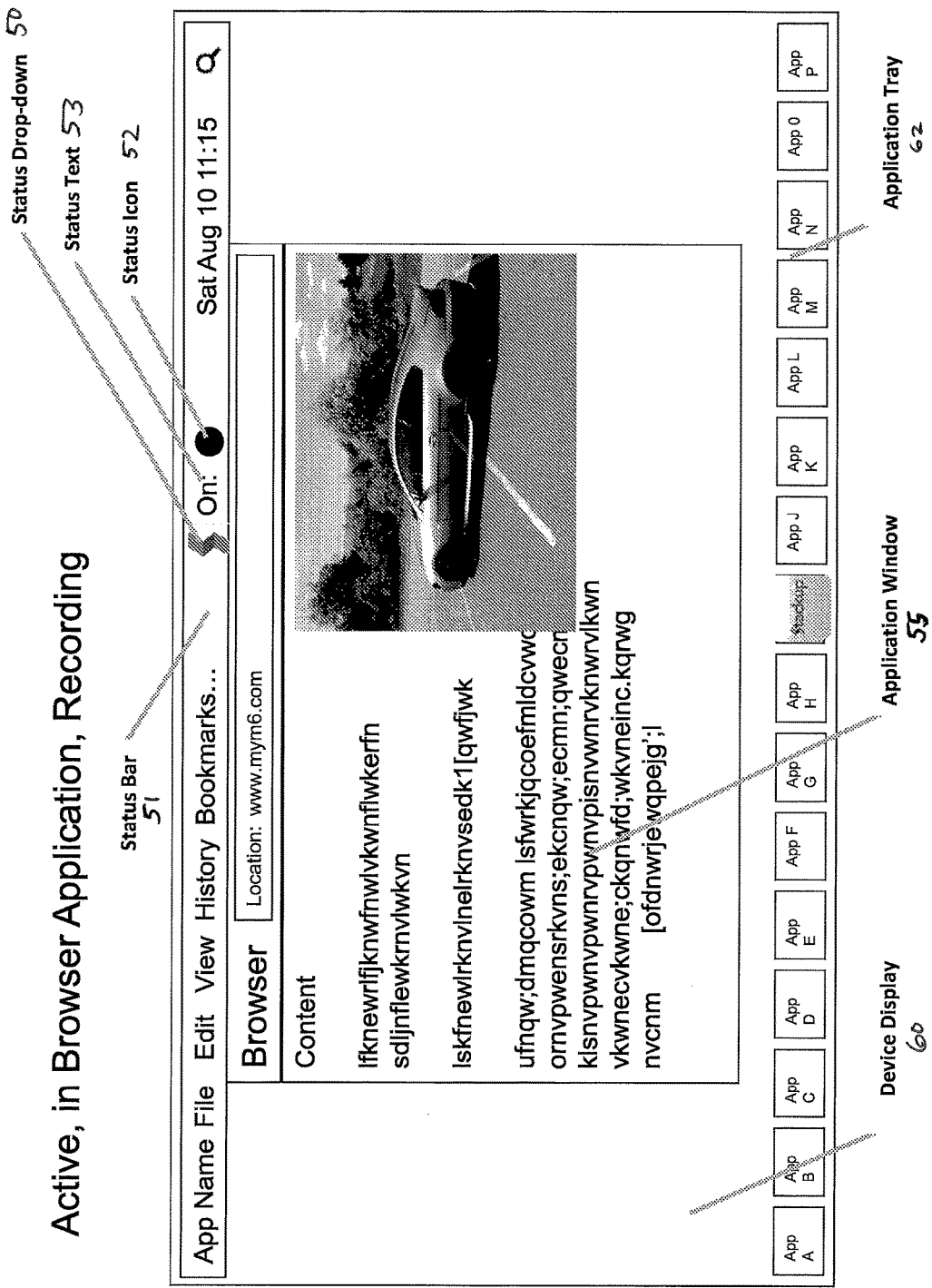
FIG. 4 illustrates an example of a graphical user interface, in accordance with one embodiment of the present invention.

Embodiments of the present disclosure can provide a mechanism for selectively recording time spent with content displayed in a supported application 39 or web site 37. In one example, a recording mode is automatically "ON" by default, but can be controlled by a Status Drop-down element 50 in the Status Bar 51 (as shown in FIGS. 4-7). The three modes of recording user interactivity may include, in one example, 'Automatically Record', 'Do Not Automatically Record', and 'Disabled'. Recording user interactivity may also be achieved manually by overriding the current recording mode by selecting the Status Icon 52 (as shown in FIGS. 4-7) directly located within the Status Bar 51 also shown in FIG. 4-7). In one example, selecting the Status Icon 52 when the record mode is 'On' (as indicated by the Status Text 53 as shown in FIG. 4) turns recording "OFF" for the given content/web page/application window 55; and conversely selecting the Status Icon 52 when the record mode is 'Off' turns recording "ON" for the given content/webpage/application window 55.

In one example, when the record mode is 'Disabled', the Status Text 53 and Status Icon 52 are not available for indication or manual control and nothing is recorded.

Stated differently, to provide access to controlling the recording mode regardless of the focused application, a grouping of Status Bar elements comprised of a Status Drop-down 50, Status Text 53, and Status Icon 52 (as shown and described in FIGS. 4-7) can be used, in one example although other controls may be used if desired.

In the example of FIG. 4, an example of a browser is illustrated having content from a webpage of a website displayed within an application window 55 of a display 60 of a user device 38. A status bar 51 may be provided which includes a status text field 53 and a status icon 52. A status drop down menu or control 50 may also be provided in the status bar 57. An application tray 62 may list a plurality of application programs.

Figure 8:
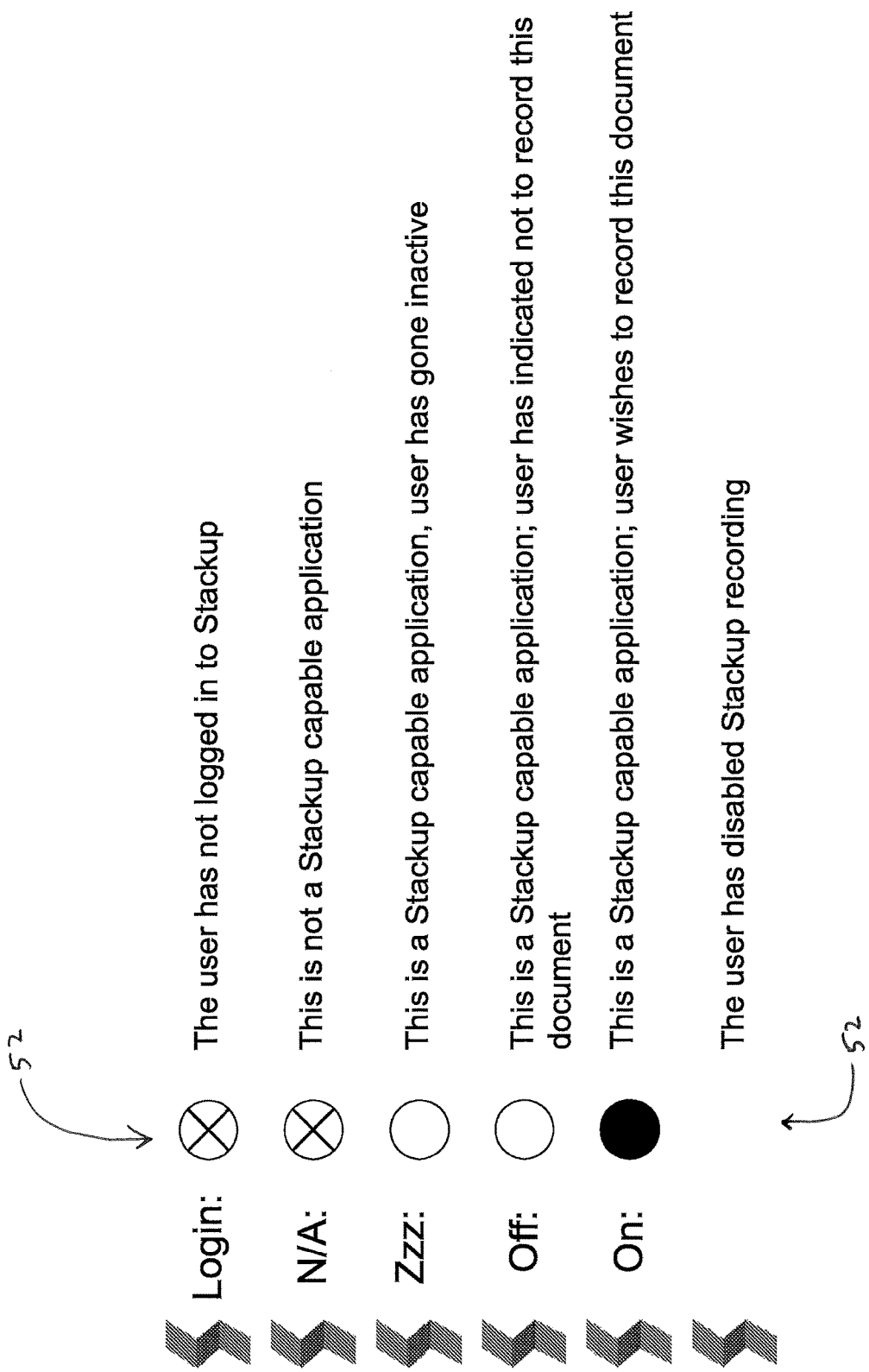
FIG. 8 illustrates examples of a status icon/control 52 for a graphical user interface, in accordance with one embodiment of the present invention.

The status icons 52 can take various forms, for instance as shown in FIG. 8. Referring back to FIG. 4, the status icon 52 shown in FIG. 4 indicates that this webpage is one where the user wishes to record interactivity with this content.

Figure 5:
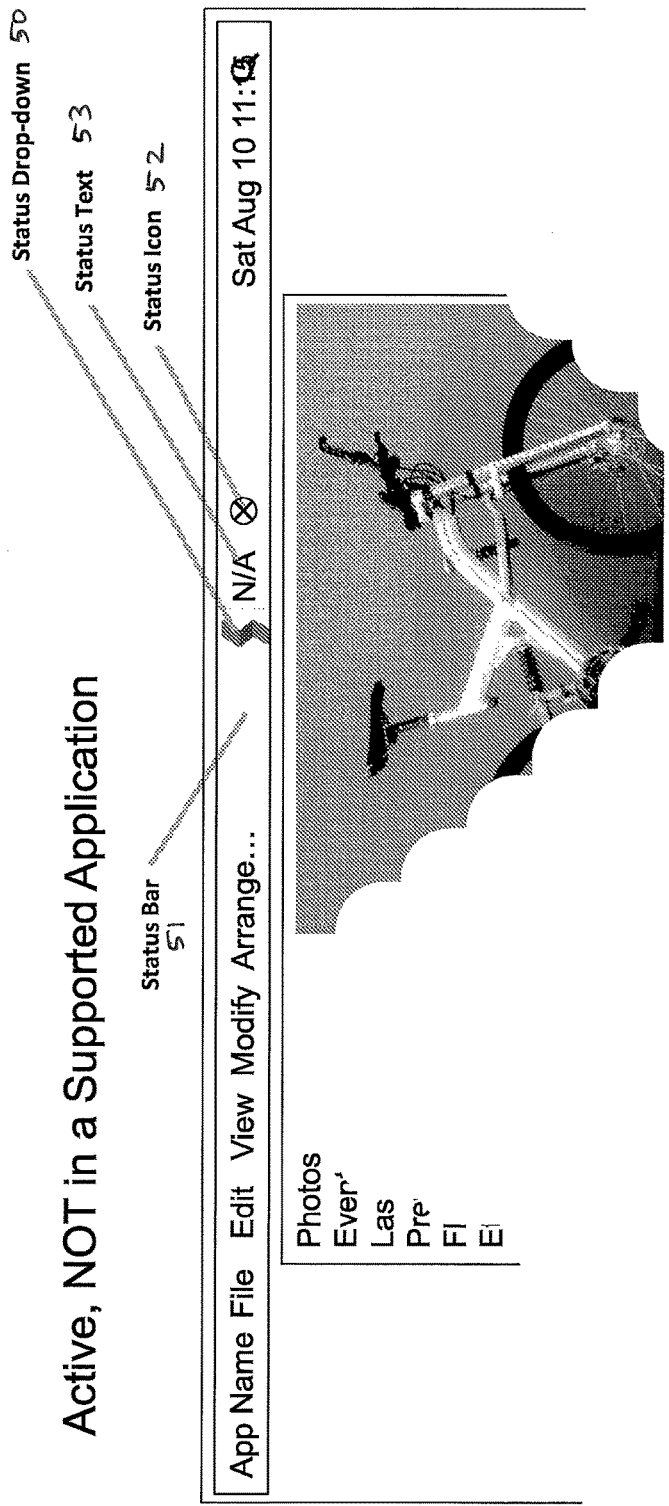
FIG. 5 illustrates an example of a graphical user interface, in accordance with one embodiment of the present invention.

Referring to FIG. 5, FIG. 5 illustrates an example of a webpage 37 or application 39 which is not a supported application; in other words, the application 39 or webpage 37 is one which interactivity therewith is not trackable, as indicated by the status icon 52 in the status bar 51 of FIG. 5.

Figure 6A:
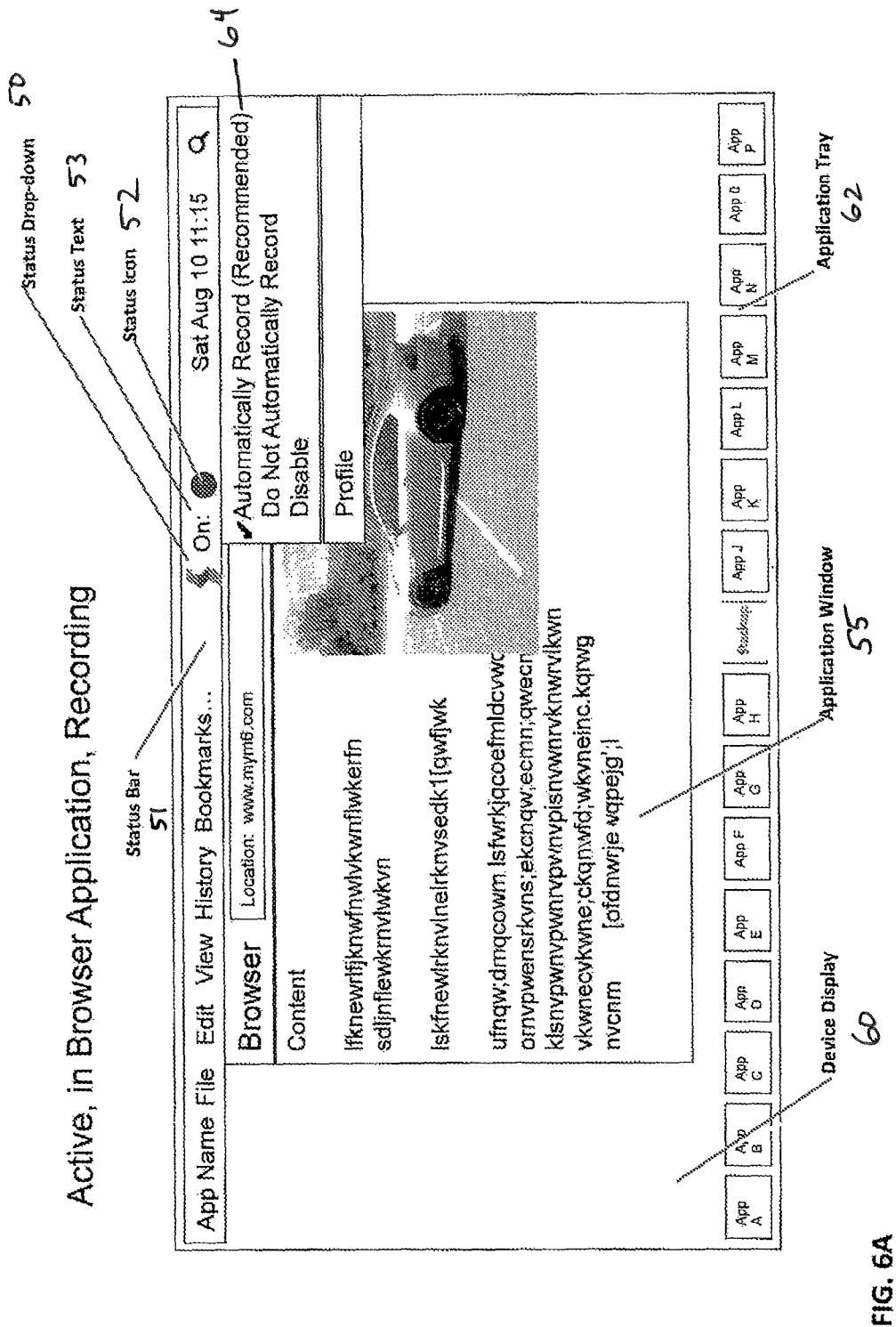
FIGS. 6A-6C illustrate examples of a graphical user interface, in accordance with one embodiment of the present invention.
Figure 6B:
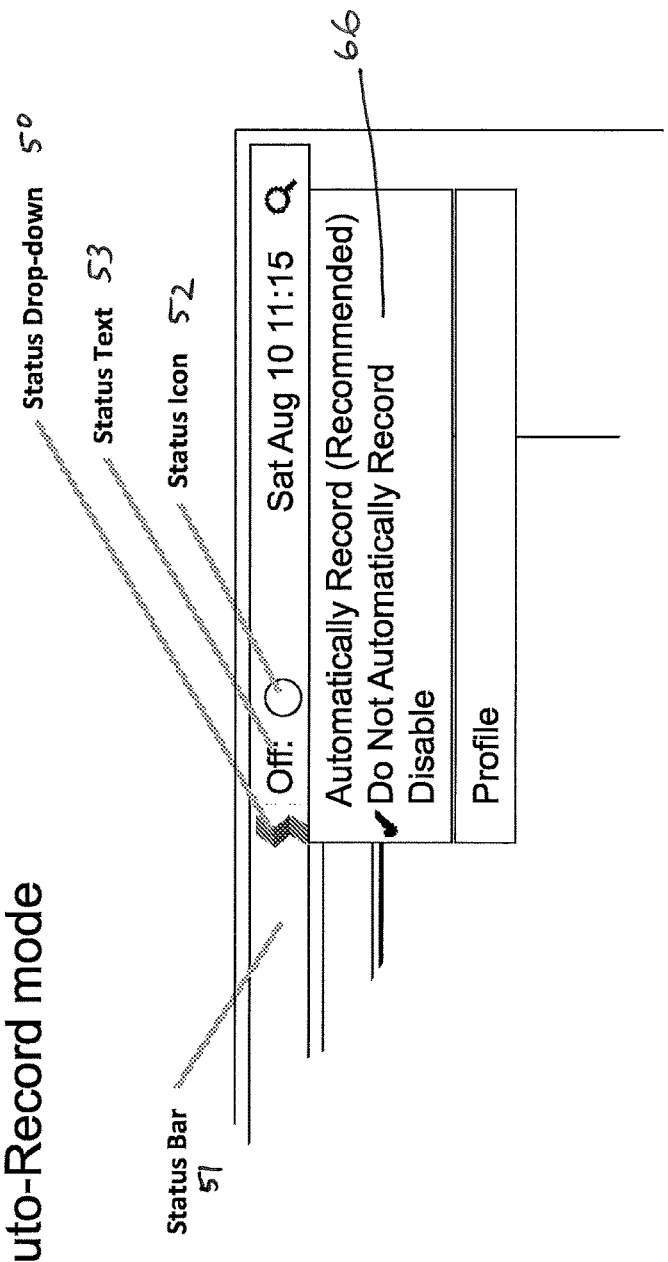
Figure 6C:
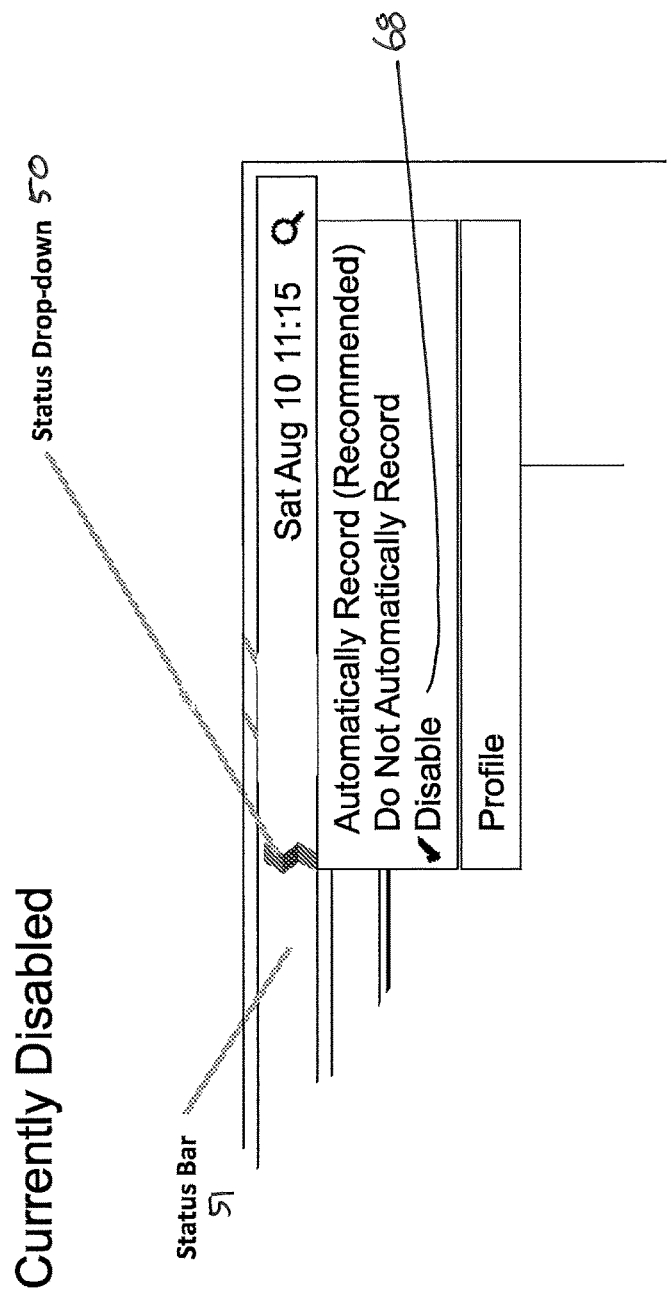

FIGS. 6A-6C illustrate various examples of the status drop down menu 50. In FIG. 6A, the status drop down menu 50 includes a control 64 to automatically record interactivity with a particular website 37 or application program 39. In FIG. 6B, the status drop down menu 50 has a control 66 to not automatically record a particular website 37 or application program 39. In FIG. 6C, the status drop down menu 50 includes a control 68 to disable tracking of interactivity with a particular website 37 or application program 39. Therefore, as can be seen that through the use of the various controls provided in the examples of a status drop down menu 50 shown in FIGS. 6A-6C, a user may be provided with controls to permit the user to automatically record interactivity, not automatically record interactivity, or disable tracking of interactivity, as desired with application programs 39 or web sites 37.

Figure 7:
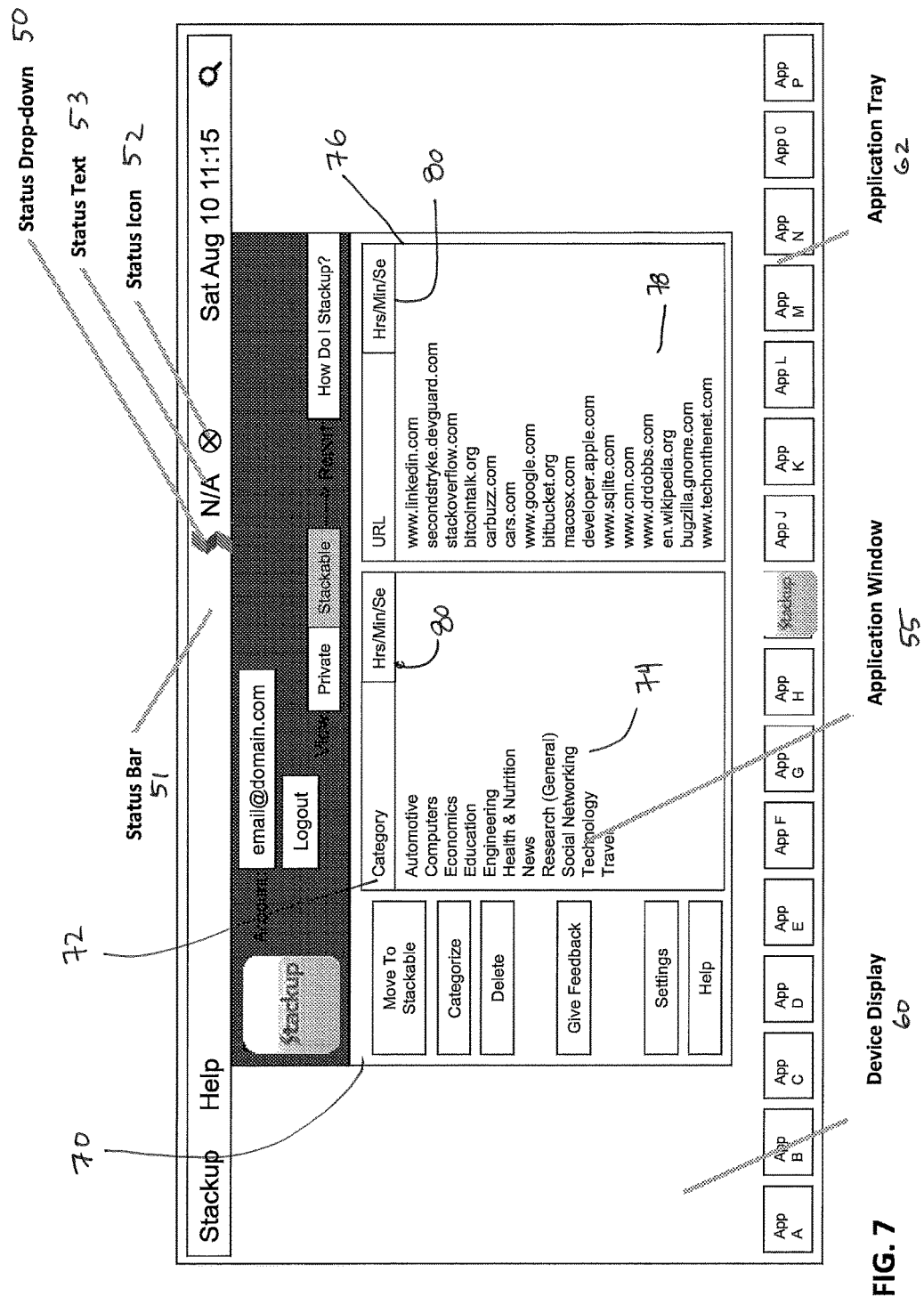
FIG. 7 illustrates an example of a graphical user interface, in accordance with one embodiment of the present invention.

In FIG. 7, an example of graphical user interface 70 is provided, showing a category pane 72 with a list 74 of categories, and a website pane 76 with a list 78 of websites. One or more websites can be associated with various categories, and a user, through use of the status drop down controls 50, can enable/disable tracking of interactivity with specific websites 37, application programs 39, or categories of websites. As shown in FIG. 7, a graphical user interface 70 may also include a display of time spent 80 by the user in interacting with specific websites, or with categories of content.

FIGS. 9A-9D illustrate examples of various processes that may be utilized to calculate and recording a user's interaction time with one or more selected web sites 37 or application programs 39, in accordance with one embodiment of the present invention. It is understood that these specific processes are provided by way of example only, and that embodiments of the present disclosure can be implemented using different arrangement or combination of operations dependent upon the particular implementation. One or more of these processes, or portions thereof, can be implemented by an interactivity tracking engine 40 running on a user's computing device 38 or a server 32 or other computing device.

The processes can effectuate recording of time spent viewing selected content and gauging user interactivity based on application window size, content approximation, and human interface device events.

In one example, the processes of FIGS. 9A-9D may be implemented on an event driven basis, and a reloadable decay timer may be utilized along with a tick counter representing time increments (e.g., seconds) that a user has spent interacting with a web site or application program in the form of credits. The reloadable decay timer can be utilized to provide the user with credits for the time increments (e.g., seconds) that accumulate while interactivity is detected (for instance via mouse clicks, keyboard events, scroll events performed by the user), wherein the timer is loaded with a value based on the size of and content in a window that the user has opened. In one example, so long as the user is interacting with the window/website/application program, the timer is reloaded and the credits increase, until a time when the user is no longer interacting with the window/website/application program, and the timer expires. When the timer expires, the process may enter an inactive mode wherein the user is not accumulating credits and the total count of the credits is retained or stored.

Figure 9A:
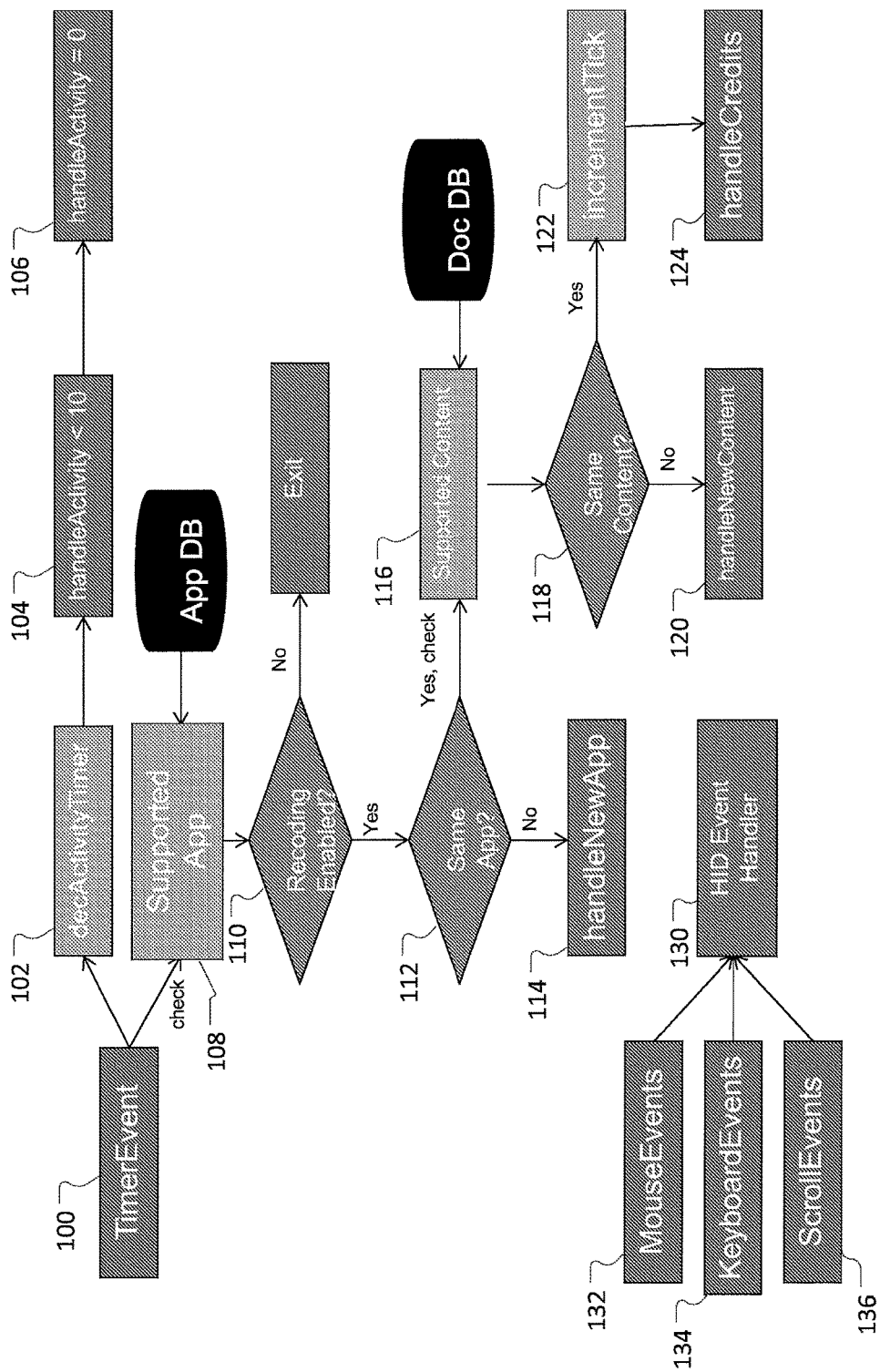
FIGS. 9A-9D illustrate examples of processes for calculating and recording a user's interaction time with one or more selected web sites or application programs, in accordance with one embodiment of the present invention.

For instance, in FIG. 9A, timer event 100 may initiate a decrement of a reloadable decaying activity timer at operation 102, while incrementing the credits to the user at operations 122-124 for each second of interactivity with a tracked web site or application program.

Figure 9B:
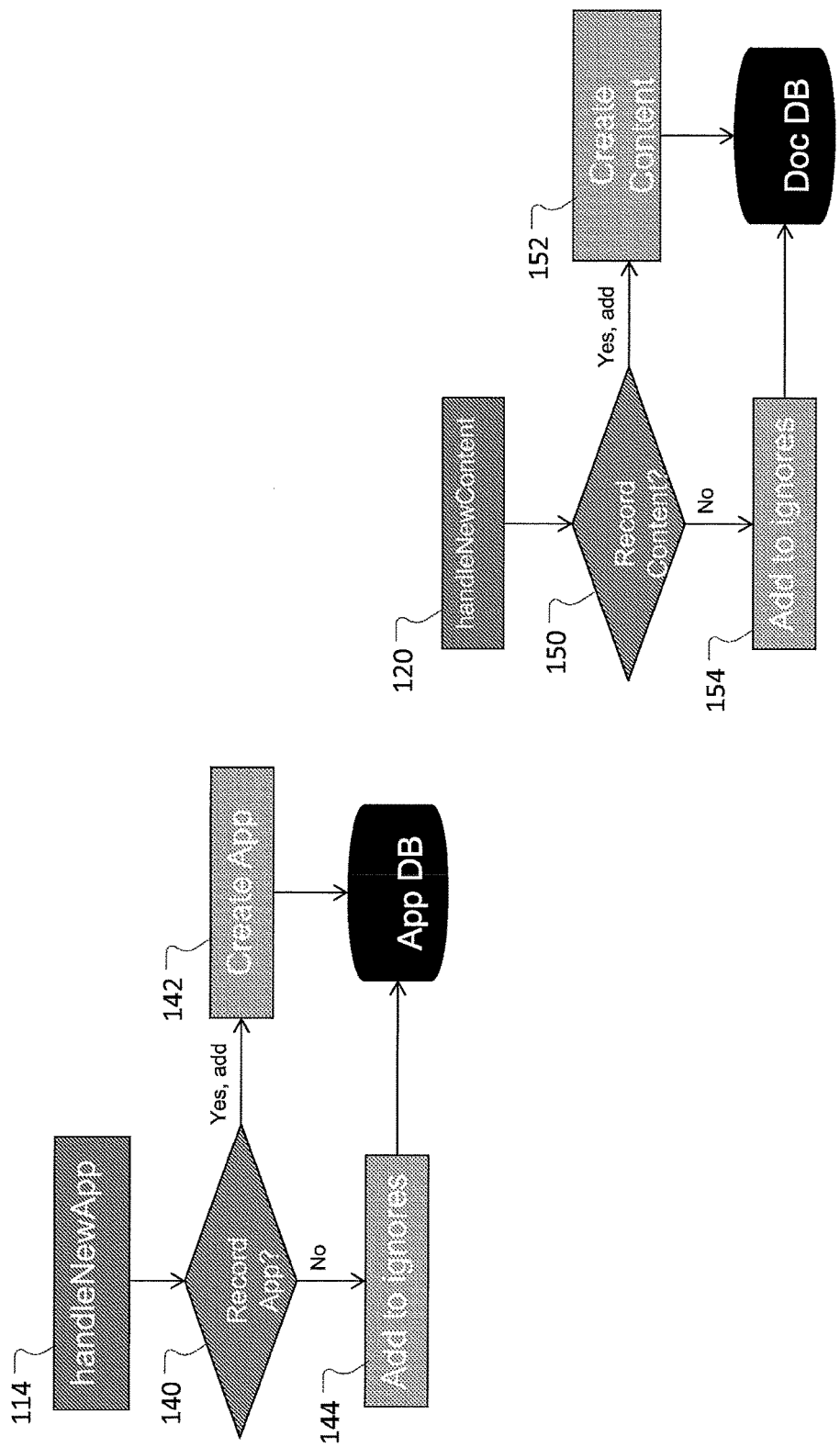
Figure 9C:
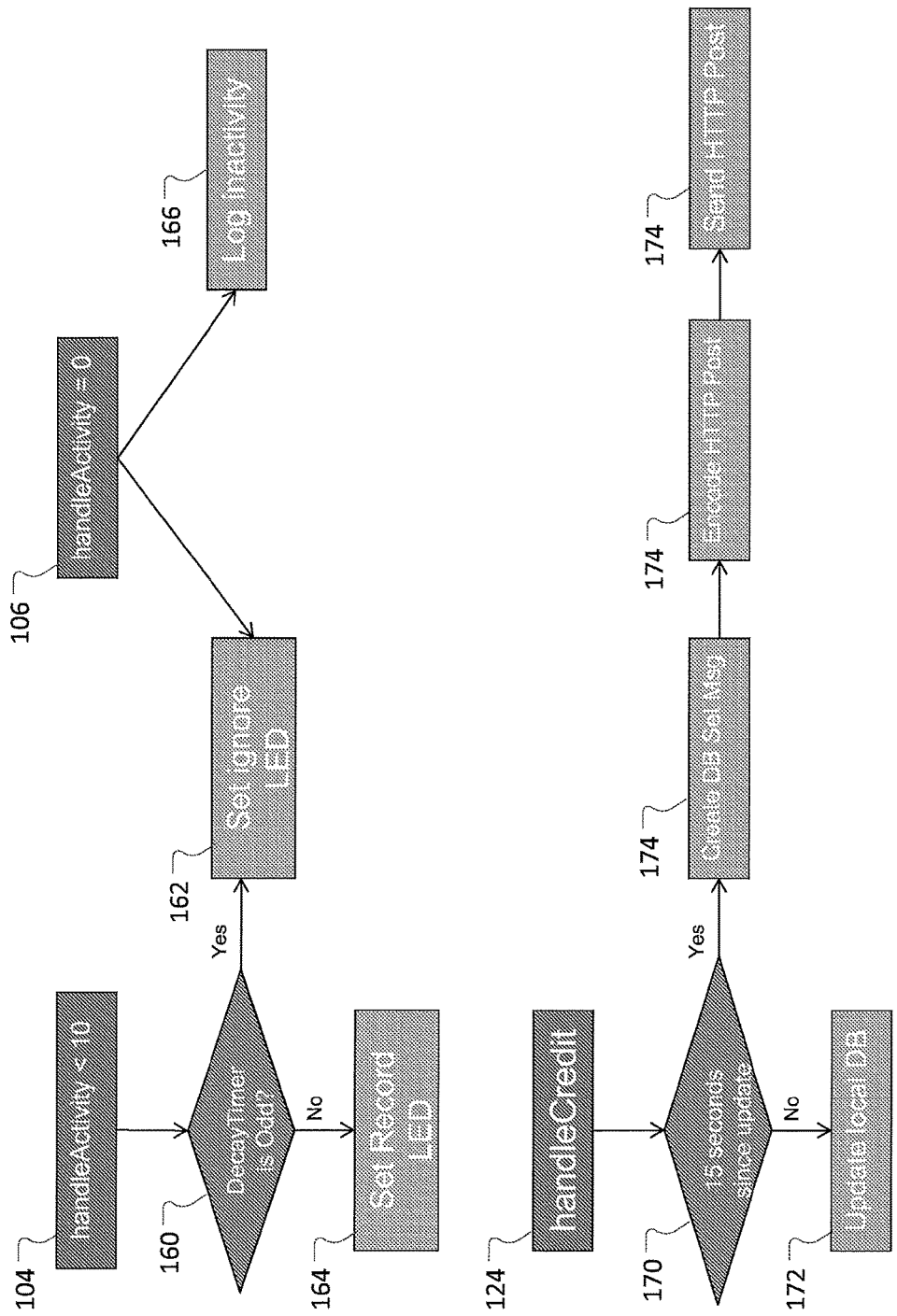

In one example, if the activity timer is less than a threshold value (such as 10 in one example) at operation 104, control may be passed to FIG. 9C. If the activity timer at operation 106 has reached zero, control may be passed to FIG. 9C.

In parallel with operation 102, operations 108-124 increment the credits to the user if, interactivity is occurring by the user with a supported application program (operation 108), recording is enabled (operation 110), and/or the interactivity is occurring by the user with a website selected for tracking (operation 116, shown as "supported content").

Operation 108 determines whether an application running by the user is supported for purposes of tracking interactivity with the application, and operation 108 may access an application database which may include a table or list of supported applications. If a new application program is desired to be tracked, operation 114 passes control to FIG. 9B.

Operation 116 determines whether a web site accessed by the user is supported for purposes of tracking interactivity with the web site, and operation 116 may access a database (shown as "doc" database) which may include a table or list of supported web sites. If a new website is desired to be tracked, operation 120 passes control to FIG. 9B.

FIG. 9A also illustrates a human interface device (HID) event handler 130 which can be triggered upon various user interactivity with a window of a particular website or application program. In one example, a user moving a mouse input within a window to be tracked (operation 132) triggers the HID event handler 130. In one example, a user depressing a key of a keyboard that effects a window to be tracked (operation 134) triggers the HID event handler 130. In one example, a user scrolling a window to be tracked (operation 136) triggers the HID event handler 130. Other human interface device events may also trigger handler 130, such as through user input (such as a swipe or tap) to a touch screen input or stylus input of a tablet computer, Smart phone, or other computing device.

In FIG. 9B, at operation 114, where a new application program window is opened, operation 140 determines whether the user desires to record interactivity with the new application, and if so, at operation 142 that application program is added to the database of application programs to track interactivity with. Conversely, if operation 140 determines that the user does not desire to track interactivity with the application program, then operation 144 adds the particular application program to a list or data structure of application programs to ignore and not track interactivity with.

Similarly, also in FIG. 9B, at operation 120, where a new web site window is opened, operation 150 determines whether the user desires to record interactivity with the web site, and if so, at operation 152 that web site is added to the database/list/data structure of web sites (URLs) to track interactivity with. Conversely, if operation 150 determines that the user does not desire to track interactivity with the web site, then operation 154 adds the particular web site to a list or data structure of web sites to ignore and not track interactivity with.

In FIG. 9C, at operation 104, if the activity timer in one example is less than 10, then operations 160-164 can flash a "Record" indicator or icon which can signal to the user that the process is nearing the point where inactivity will be detected. In other words, because the activity timer is a reloadable countdown timer that gets reset upon detecting user interaction with a webpage window or application program window (see FIG. 9D), if there is no activity by the user detected with respect to a webpage window or application program window being tracked, then the countdown timer counts down to 10 and below. At operation 106 in FIG. 9C, when the countdown timer expires (e.g., reaches 0 in one example), then operation 166 logs the inactivity of the user and operation 162 sets the record status icon to inactive.

In FIG. 9C, operation 124 handles the timer credits awarded to the user for interactivity with website pages or application program windows that are desired to be tracked. In one example, the process 124 may periodically transmit a message updating the timer credits to a server/database (for instance, remotely located over a network as shown in FIG. 2). In the example of FIG. 9C, operation 170 determines whether 15 seconds has passed since the previous update, and if not, operation 172 updates a local database with the value of the timer credits awarded to the user for interactivity. If operation 170 determines that 15 seconds has passed since the previous transmission of an update occurred, then control is passed to operation 174 which creates a message and transmits the message, with the value of the interactivity timer credits awarded, to a server/database over a network such as the Internet where the total counts of the credits for the user can be persistently stored and made available for generating reports for the user and third parties if desired.

Figure 9D:
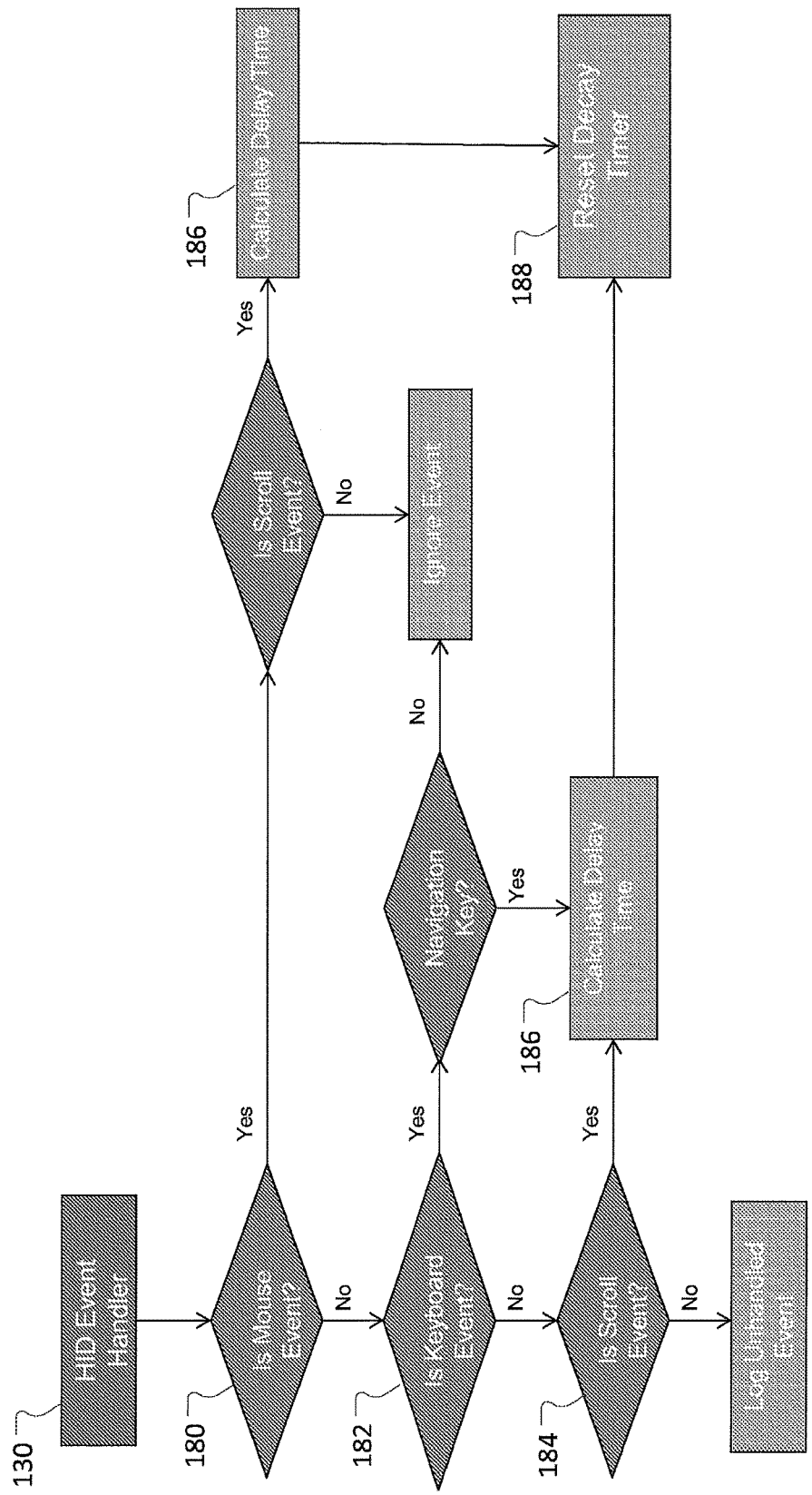

Referring to FIG. 9D, operation 130 handles human interface device events. If user interactivity with a mouse input device is detected at operation 180, or with a keyboard at operation 182, or a scroll event at operation 184 (such as through a touch screen, touch pad, rotary input control, or otherwise), then operation 186 calculates a decay time or value to load in the reloadable countdown activity timer, and operation 188 resets the countdown activity timer (shown as the "decay timer") with the value calculated by operation 186. Stated differently, upon user interactivity with a website window or application program window that is being recorded, the countdown timer is reloaded with a fresh starting value—which in effect allows the user to earn additional counts/credits for such interactivity as described above.

Stated differently, in one example, a process may include a derived focused rectangle from the currently active application's window may be defined as a region. Human interface device (HID) events within this region may comprise activity. Pictures, text, video, etc. loaded within the region may comprise information. The access location (local or from the cloud) comprises the source of the information. The amount of information that is displayed within the given region can be used to determine an approximate minimal duration without activity the user may require to absorb said Information. A decaying timer is also set, in one example. If no user interaction is observed via HID events within the decaying activity timer, time accrual for the current content in the current application is suspended, until further HID events or activity in the content or application is detected.

An example of the processes of FIGS. 9A-9D is provided for purposes of illustration only. Assume that a user launches a Safari browser program window and loads www.cnn.com which is a news website that the user is automatically recording/tracking interactivity time therewith. Assume that, based on the content of the CNN.com window, 30 seconds is loaded into the timer. The timer then decrements to 29 seconds, but the interactivity credit ticks increment to 1 second. Assume that the user is reading the content but is not interacting with the mouse, touch screen, or other human interface device. Therefore, the timer will continue to countdown until the timer reaches 9 seconds, and the credit ticks will continue to increment until they reached 21 seconds. Assume at this point that the user scrolls down to read more content of the website, which triggers a reloading of the countdown timer; and assume that the timer is reloaded with a value of 30 seconds based upon the amount of content in the browser window from CNN.com after the user scrolls. Hence, with the timer reset to 30 seconds, the timer continues to countdown and the credit ticks continue to increment/increase. As the user continues to read the content in the CNN.com browser window, assume that the user interacts with the content which resets the timer in this example with another value, for example 30, while the user has accumulated for example, 42 seconds of interactivity credits.

Assume that the user then leaves the user's computer; the timer will then countdown until it reaches 9 seconds, when the process will flash the record LED indicator to show the user that inactivity has been detected, and the credit ticks will continue to increment, totaling 50 seconds of interactivity credits and a timer will decrement to zero. The record LED indicator will turn off, and the status icon can be changed to "ZZZ" indicating that user inactivity with the web page cnn.com is occurring and that no further interactivity credits are being accumulated at this time.

In this example, the 50 seconds of interactivity credits earned by the user for interactivity with the webpage CNN.com can be transmitted over a network to a server and persistently stored in a database associated with the user's account.

One feature of an embodiment of the present disclosure is that the value loaded into a countdown timer is dynamically calculated based upon the content of a particular website window or application program window that is being recorded/tracked. In other words, where a website window or application program window has a small amount of content therein, the value loaded into the countdown timer is calculated as a smaller value in comparison with a value loaded into the count on timer where a website window or application program window has a larger amount of content therein.

The following example pseudo-code provides an example of the calculation of the value to load into the countdown timer based upon the content of a website window or application program window that is being interacted with by the user and being recorded/tracked:

Let Area( )=square inches of provided rectangle

Let Density.Text=(number of words in the provided text*2 seconds)

Let Density.Graphic=(Area (graphic rectangle)/Area (application window rectangle))

If (Content is Video or Audio)

Let Activity decay time=Video or Audio duration

Else

Let Activity decay time=((Area (Region)+Density.Text)–(Area (Region)*Density.Graphic))

While a supported application is focused

{

If Activity decay timer has not expired

Time is recorded;

If Activity (as a subset of all HID events) is detected within application window rectangle Activity decay timer is replenished;

If the Activity decay timer reaches 0:

Recording time stops;

}

It is understood that this pseudo-code is provided by way of example only, and that embodiments of the present disclosure could be formed using other code or process steps if desired.

Figure 10:
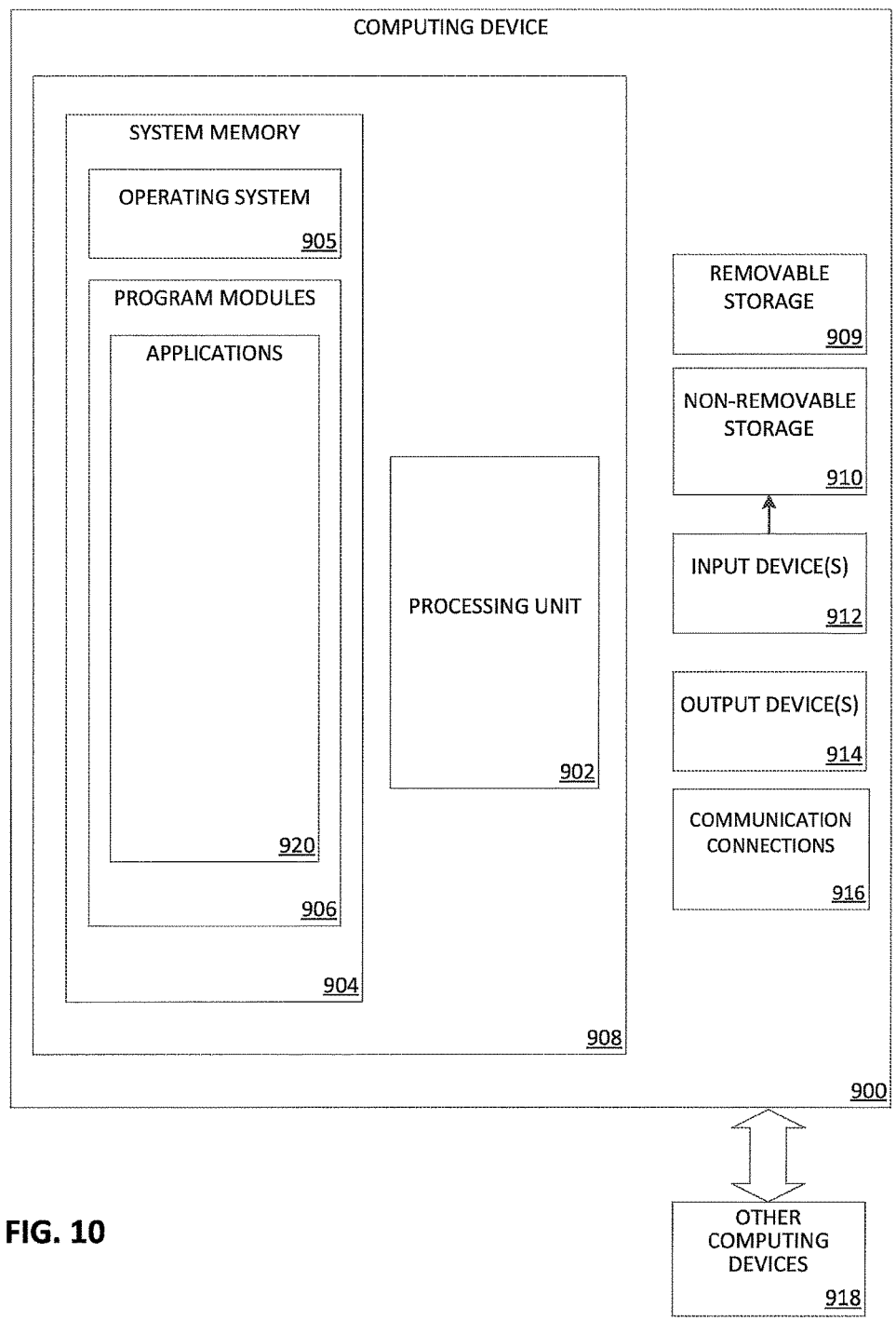
FIG. 10 is a block diagram illustrating example physical components of a computing device that may be used with one or more embodiments of the present disclosure.
Figure 11:
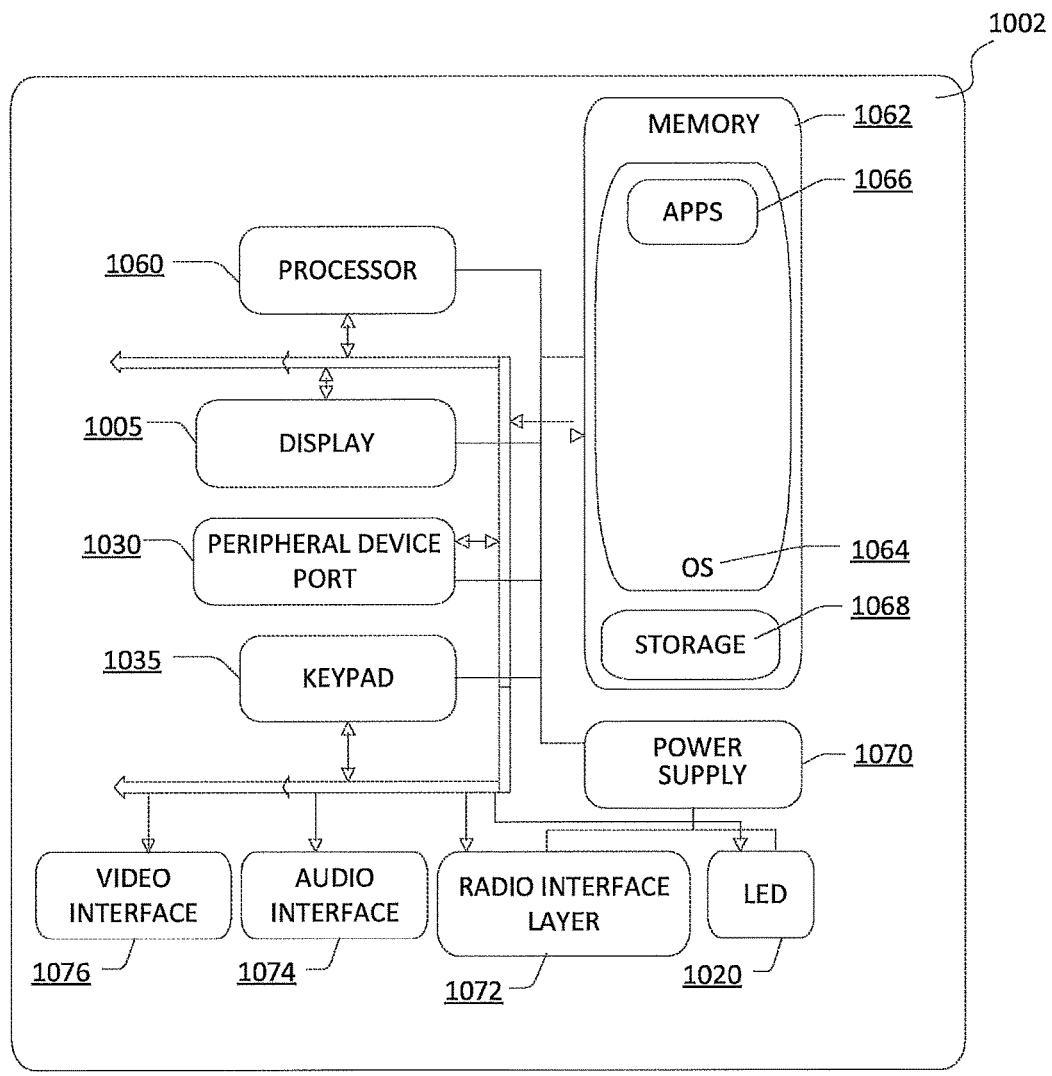
FIG. 11 is a simplified block diagram of a computing device that may be used with one or more embodiments of the present disclosure.

FIGS. 10-11 and the associated description below provide a discussion of a variety of operating environments in which embodiments of the present disclosure may be practiced. However, the devices and systems illustrated and discussed with respect to FIGS. 10-11 are for purposes of example and illustration and are not limiting of a vast number of computing device configurations that may be utilized for practicing embodiments described herein.

FIG. 10 is a block diagram illustrating physical components (i.e., hardware) of a computing device 900 with which embodiments of the present disclosure may be practiced. For instance, computing devices 38 of FIG. 2 may be implemented using one or more features, structures or aspects of computing device 900 of FIGS. 10-11. The methods and user interfaces described above may be suitable for computing devices 900 or 1000 described below. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running software applications 920. The operating system 905, for example, may be suitable for controlling the operation of the computing device 900. Furthermore, embodiments of the present disclosure may be practiced in conjunction with a graphics library, other operating systems, or any other application program and is not limited to any particular application or system. This basic configuration is illustrated in FIG. 10 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 10 by a removable storage device 909 and a non-removable storage device 910.

As stated above, a number of program modules and data files may be stored in the system memory 904. While executing on the processing unit 902, the program modules 906 may perform processes including, but not limited to, one or more of the stages of the methods illustrated in FIGS. 1-9. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 900 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The computing device 900 may also have one or more input device(s) 912 such as a keyboard, a mouse, a pen, a sound input device, a touch input device, etc. The output device(s) 914 such as a display, speakers, a printer, etc. may also be included. The aforementioned devices are examples and others may be used. The computing device 900 may include one or more communication connections 916 allowing communications with other computing devices 918. Examples of suitable communication connections 916 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 11 illustrates an exemplary mobile computing device 1000, for example, a mobile telephone, a smart phone, a tablet personal computer, a laptop computer, and the like, with which embodiments of the present disclosure (such as device 38) may be practiced. Specifically, FIG. 11 is a block diagram illustrating the architecture of one embodiment of a mobile computing device. That is, the mobile computing device 1000 can incorporate a system (i.e., an architecture) 1002 to implement some embodiments described herein. In one embodiment, the system 1002 is implemented as a "smart phone" capable of running one or more applications (e.g., browser, e-mail, calendaring, contact managers, messaging clients, games, and media clients/players). In some embodiments, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio 1072 that performs the function of transmitting and receiving radio frequency communications. The radio 1072 facilitates wireless connectivity between the system 1002 and the "outside world," via a communications carrier or service provider. Transmissions to and from the radio 1072 are conducted under control of the operating system 1064. In other words, communications received by the radio 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the individual takes action to indicate the powered-on status of the device. The audio interface 1074 is used to provide audible signals to and receive audible signals from the individual. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 11 by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio 1072 or via a distributed computing network. Similarly, such data/information may be readily transferred between computing devices for storage and use according to well-known data/information transfer and storage means, including electronic mail and collaborative data/information sharing systems.

Embodiments of the present invention can be used for various purposes, such as disclosed in commonly-owned, U.S. Provisional Patent Application No. 61/900,987, filed on Nov. 6, 2013 entitled "Method and System for Determining Proficiency on a Subject" the disclosure of which is hereby incorporated by reference in its entirety.

While various Figures of the present disclosure have been described with reference to tracking user interactivity with websites 37, it is understood that aspects and features of the present disclosure can also be used for tracking interactivity of a user with various application programs 39.

Hence, it can be seen that various embodiments of the inventions disclosed herein provide for selectively recording and tracking an amount of time of user interactivity with specified web sites 37 or application programs 39.

While any methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

We claim:

1. A method for tracking an amount of time an individual is actively engaging with displayed content, comprising:
   providing content on a user interface of a computing device;
   tracking, based on one or more inputs received in the user interface, a first amount of time that the individual is interacting with the content;
   detecting a period of inactivity with the content provided on the user interface, wherein the period of inactivity is a second amount of time during which the individual is not interacting with the content and is determined, at least in part, on an amount of time that the one or more inputs are not received in the user interface and that the individual is not viewing the content, and wherein the detected period of inactivity automatically suspends an accumulation of the first amount of time;
   determining, based at least in part, on the first amount of time and the second amount of time, a comprehension level of the content by the individual; and
   providing the comprehension level to a computing device for display.

2. The method of claim 1, further comprising providing a control in the user interface to enable recording of the first amount of time.

3. The method of claim 1, wherein the content is provided on a URL corresponding to a selected one or more websites.

4. The method of claim 1, wherein the tracking includes accumulating a plurality of periods of times that the individual is interacting with the content.

5. The method of claim 1, wherein detecting the period of inactivity further comprises loading a reloadable timer with a countdown amount.

6. The method of claim 5, further comprising determining an average amount of time required for the individual to comprehend the content, based at least in part, on the amount of the content on the user interface.

7. The method of claim 5, further comprising determining an average amount of time required for the individual to comprehend the content based, at least in part, on a size of the user interface that displays the content.

8. The method of claim 1, further comprising providing a list of categories that correspond to the content.

9. The method of claim 1, further comprising displaying the accumulation of the first amount of time on the user interface.

10. A system for a tracking of interactivity time by a user with a web site, comprising:
    at least one processor;

a memory coupled to the at least one processor and storing instructions that, when executed by the at least one processor, perform operations, comprising:

providing a website on a user interface, the website being associated with displayed content;

detecting, based on one or more interactions with the website, comprehension of the content associated with the website by an individual that provides the one or more interactions with the website for a first amount of time;

detecting an amount of inactivity with the website, wherein the amount of inactivity is a second amount of time during which the individual does not provide the one or more interactions with the website and is not viewing the content and wherein the inactivity automatically suspends accumulation of the first amount of time;

determining, based at least in part, on the first amount of time and the second amount of time, a comprehension level of the displayed content by the individual; and displaying the comprehension level on a display of a computing device.

11. The system of claim 10, further comprising instructions for selectively recording the first amount of time.

12. The system of claim 10, further comprising instructions for detecting an initiation of a browser program that loads a URL corresponding to the website.

13. The system of claim 10, further comprising instructions for accumulating a plurality of periods of time the individual interacts with the website.

14. The system of claim 10, further comprising instructions for loading a reloadable timer with a countdown amount to detect the amount of inactivity.

15. The system of claim 10, further comprising instructions for determining an average an amount of time required for the individual to comprehend the content based, at least in part, on an amount of the content on the user interface.

16. The system of claim 10, further comprising instructions for determining an average amount of time required for the individual to comprehend the content based, at least in part, on a size of a user interface that displays the content.

17. The system of claim 10, further comprising instructions for providing a list of categories that correspond to the content.

18. The system of claim 10, wherein the one or more interactions include one or more of a mouse input, a keyboard input, movement of a user interface element and touch input.

19. A method for tracking comprehension of displayed content, comprising:

detecting access to content displayed on one or more application programs;

tracking, based on received input, a first amount of time that an individual is interacting with the one or more application programs;

detecting a period of inactivity with the one or more application programs, wherein the period of inactivity is a second amount of time during which the individual does not provide input to the one or more application programs and is not viewing the content and wherein the period of inactivity automatically suspends an accumulation of the first amount of time;

determining, based at least in part, on the first amount of time and the second amount of time, a comprehension level of the content by the individual; and providing the comprehension level of the content to a user interface for display.

20. The method of claim 19, wherein providing the comprehension level of the content to the user interface comprises displaying the first amount of time.

* * * * *